United States Patent

[11] 3,615,724

[72] Inventor Charles E. Sech
5993 Winans Lake Road, Brighton, Mich.
48116
[21] Appl. No. 832,569
[22] Filed June 12, 1969
[45] Patented Oct. 26, 1971
Continuation-in-part of application Ser. No.
526,525, Feb. 10, 1966, now abandoned.

[54] PROCESS FOR PREPARING A DEHYDRATED POTATO PRODUCT DIRECTLY FROM RAW POTATO
4 Claims, 1 Drawing Fig.

[52] U.S. Cl. .................................................... 99/207,
159/20
[51] Int. Cl. ..................................................... A23b 7/03
[50] Field of Search .......................................... 99/100,
207, 199; 159/17–20

[56] References Cited
UNITED STATES PATENTS

| | | | |
|---|---|---|---|
| 3,109,739 | 11/1963 | Hilton | 99/207 |
| 3,150,978 | 12/1964 | Campfield | 99/100 |
| 3,230,902 | 1/1966 | Grimm | 99/100 |
| 3,185,580 | 5/1965 | Hanrahan | 99/199 |
| 3,297,450 | 1/1967 | Loska | 99/207 |
| 3,230,094 | 1/1966 | Hilton | 99/207 |
| 3,396,036 | 8/1968 | Liepa | 99/100 |
| 3,415,665 | 12/1968 | Hussmann | 99/207 |
| 3,451,822 | 6/1969 | Fast | 99/207 |

Primary Examiner—Norman Yudkoff
Assistant Examiner—Martin G. Mullen
Attorney—Sidney W. Russell ABSTRACT: A process for the manufacture of a dehydrated potato product directly from raw potato without requiring the addition of any binder which is suitable for hot oil cooking or frying wherein a slurry of ground raw potato is formed having a moisture content of about 80 percent, the water content of the slurry then being reduced to at least 50 percent by application of vacuum at a temperature below the temperature of gelatinization of the potato particles. The mass is then heated or cooked at a temperature sufficiently high to gelatinize the product, the latter then being dried to a moisture content of about 6 percent to twelve percent. The critical step of dehydration by vacuum evaporation achieves proper plasticity of the mass while at the same time prevents browning of the product normally occurring due to enzymatic action, or oxidative influence or both.

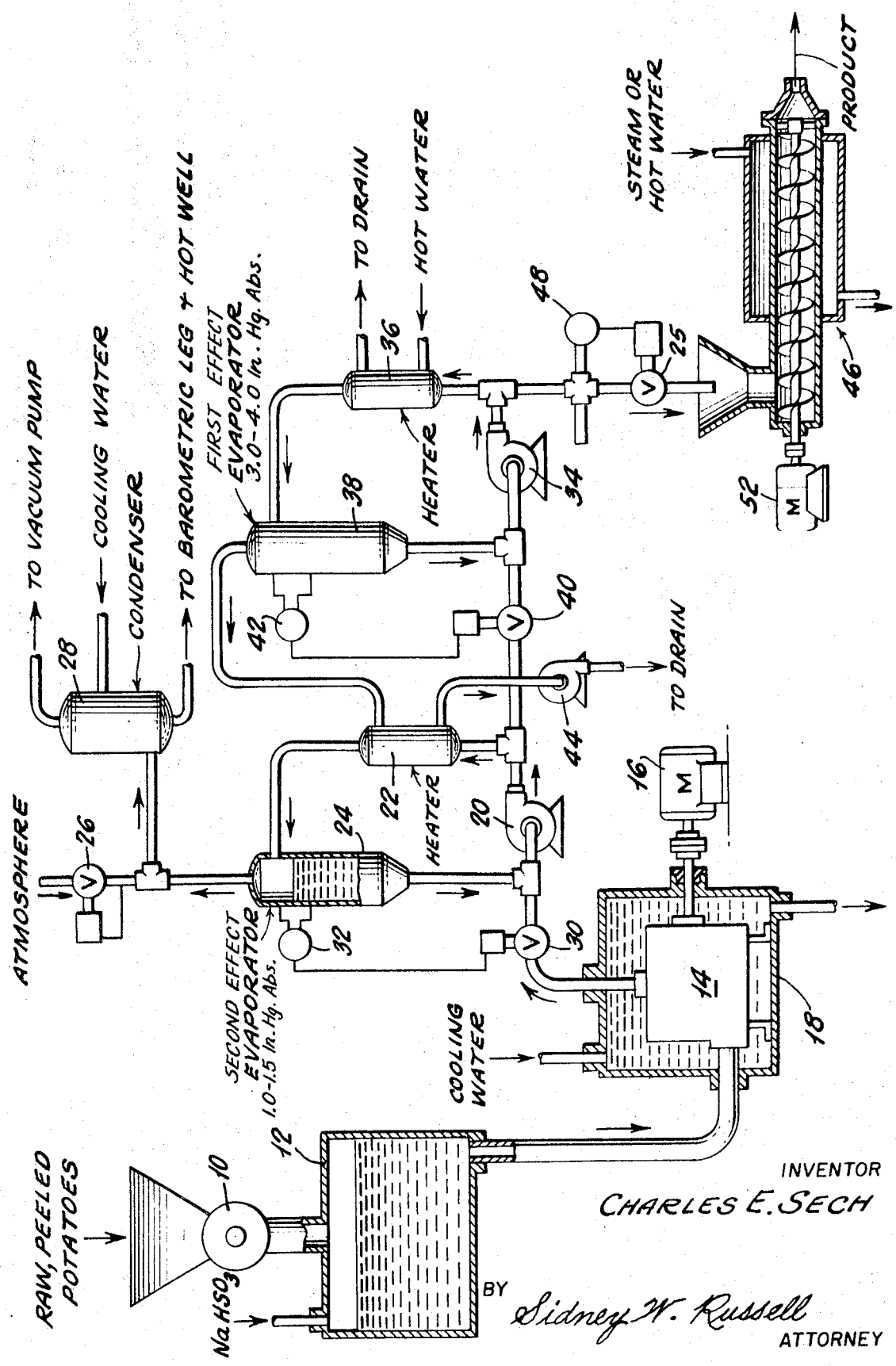

PROCESS FOR PREPARING A DEHYDRATED POTATO PRODUCT DIRECTLY FROM RAW POTATO

This application is a continuation-in-part of my application Ser. No. 526,525, filed Feb. 10, 1966 and now abandoned.

This invention relates to a process for manufacturing a dehydrated potato product directly from raw potato, without addition of a gelatinization promoter, nor other reagent necessary to achieve proper plasticity and cohesiveness for extrusion purposes. The resultant and extruded product is suitable for immediate deep-fat frying.

BACKGROUND OF INVENTION

As has been observed in the prior art there are many problems revolving about the processing of the raw potato in such fashion as to produce directly therefrom an ultimate, extruded product, which can be directly prepared for consumption by deep-fat frying.

Basically, one severe troublesome aspect is that in dealing with the raw product, various types of processing of same subject the product to deterioration and particularly deterioration consequent upon so-called browning of the potato. The latter may occur through either enzymatic action, or oxidative influence, or both. In each case, undue exposure to the air as a result of ordinary methods of drying, as any commonly used air-drying procedure, is deemed to be the underlying cause of same. Yet drying or dehydration is an absolute necessity in as much as when the raw potato is ground to a fine constituency the large proportion of water in the potato (80% or more) renders the resultant slurry so fluid or of such low viscosity that further processing of such slurry, as by extrusion, after gelation is rendered completely impossible. Also, additional water is added via addition of any usual color deterioration inhibitor, usually added by way of water solution. The problem has been pointed to by a rather complete work entitled "-Potato Processing" by Talburt and Smith, 1949. In this publication "browning" is mentioned as being "* considered by many to be enzymatic in nature *." It is also said that "* oxidation by atmospheric oxygen is involved in the graying that occurs in dehydrated potatoes *." (see cited text pages 316, 336 and 347).

Although certain types of potatoes are more resistant than others to graying or browning during processing involving air dehydration the problem remains with regard to all varieties, i.e., some undesirable darkening of color taken place with any ordinary and common dehydration procedure involving exposure to air, and more often that not, air at elevated temperatures.

It is true also that with regard to air dehydration, that at air temperatures in excess of about 150° F. to 170° F., while a given slurry of finely ground potato is being dehydrated, the starch in the potato gelatinizes, this again rendering the product difficult to further process. If extended air-drying utilized at lower temperatures, then it is obvious that such greater time of contact with air results in even greater browning or darkening of color. The aim of any procedure is of course quite to the contrary—to achieve a processed product that is white in color, or namely, a near duplication of the original color of raw potato.

Most processors of the prior art use an additive such as sodium disulfite or equivalent salt. This is intended to prevent the referred to discolorization during processing. Although this is desirable, there are definite limitations with regard to use of such reagent. Firstly, the amount to be used varies greatly with regard to the type of potato being processed. Also, experimentation indicates that there is a practicable limitation as to the amount of this substance which can be added, either from a taste viewpoint after processing, or from the aspect that undue exposure to air outweighs or takes precedence over the effect any such additive may have as a preventive towards browning due to, particularly, either enzymatic or oxidative action.

The here primary desideratum, obtained by practice of the process of the instant invention, is the production of an ultimate product so processed that browning or discolorization, due to undue oxidation or enzymic action, or otherwise, is rendered impossible. This method involves the use of a vacuum for dehydration purposes. Such may be effectuated by a simple vacuum pump, single effect flash evaporation, or multiple effect evaporation.

The desired pressure will normally fall within the range of 1 to 4 inches of mercury, absolute. Multiple effect evaporation may be more suitable for large production facilities, as more economical in overall operation. At any rate, dehydration of the ground potato slurry is readily accomplished by any one of these courses. The important result of same, by the very nature of such type of dehydration, is that air is substantially excluded, and thus prevented from substantial and prolonged contact with the product. Also, and as stated, the substances naturally present in the starch which promote gelatinization remain in solution and are not removed. The result is that during dehydration of this type, discolorization, from whatever cause, is substantially or completely prevented.

Examples of test runs which will be referred to later illustrate with great clarity the nature of the problem referred to in the foregoing.

These examples demonstrate that no practical reduction in moisture content of the potato slurry can be accomplished by air-drying at a temperature point below the gelatinization temperature without resulting in undesirable discolorization, as referred to above. It also might be added that unless sufficient simple air-drying be utilized to achieve the substantial dehydration, which is necessary for full processing, and kept at a temperature high enough to effectuate dehydration, some form of cooling of the mass may be or is necessary before further steps, such as extrusion, become practicable. Cooling of the mass of course renders it sufficiently plastic to handle, but on the other hand, cooling involves an additional substantial cost, thus further rendering that type of procedure of far less commercial and practical desirability.

At least one dehydrated potato product on the market is made from potato starch or potato flour with the only additives being ordinary table salt and water. Such a process, however, involves the additional steps of producing the dried starch or flour, adding water, and preparing a dough which is subsequently extruded and either fried as extruded, or partially dehydrated, and then fried. Also, the salt which seems to be essential to produce satisfactory puffing when the material is fried causes an increase in the rate at which rancidity products are formed in the hot cooking or frying oil, thus shortening the shelf life of the product.

Attempts have been made to grind the raw potato and extrude it in the uncooked form to make chips or rods which could subsequently be dried and then cooked in deep fat. The raw ground potato will not form a plastic cohesive mass, however, unless other materials such as methyl cellulose are added as a binder, or alternatively, such a step as cooling to a low temperature is employed after gelling to obtain the proper plasticity and cohesiveness necessary for extrusion or an equivalent moulding procedure.

As pointed out above, the main reason for removing water from the ground potato slurry prior to gelatinization is to end up with a semisolid which, after gelatinization, can be easily handled. If some water is not removed from the slurry, one obtains a sticky, semiliquid which is practically impossible to manipulate, this because it lacks the proper cohesion and plasticity for further processing.

In prior art practices, removal of water by either centrifuging or filtration has also been mentioned. However, experimentation has demonstrated that if these methods be utilized to remove water from the slurry before gelatinizing, there is little or no puffing or swelling upon subsequent frying.

With regard to such practices as just referred to it has been theorized that the major portion of the gelling agent in the potato is dissolved in the liquid phase and remains there when this liquid is removed, as by filtration or centrifuging. This is because it was found, after using these methods of water extraction, that a somewhat porous and mealy mass was obtained upon extrusion. Such a mass was insufficiently viscous, not cohesive, and tended to fall apart. Amylose has been pointed out in prior art literature as a possible gelling agent, present in the raw product. But being in solution, it, as other gelling agents present in situ, is removed with the filtrate, and with the results just referred to.

However, by use of a vacuum dehydration by any method, but preferably by single or multiple effect evaporation, it has been determined that this result does not occur—such gelling agent is retained in solution in the liquid present in the slurry, so that a subsequent temperature rise does properly effectuate gelatinization. The resultant mass is thus of proper plasticity, is easily handled, and can be appropriately extruded into a product of proper cohesiveness and strength suitable for subsequent deep-fat frying.

OBJECTS AND ADVANTAGES OF THE INVENTION

Accordingly, it is an object of this invention to produce directly from raw potato, without addition of any binders, a potato product which is in a form suitable for further dehydrating, forming, cooking and deep-fat frying.

It is a further object of this invention to provide an improved process for efficiently dehydrating raw potato while maintaining the raw potato material below its gelatinization temperature during the process.

It is an additional object of the invention to provide a procedure of dehydration of the ground potato slurry by way of evaporation, in contrast to such known procedures as ordinary air drying, centrifuging or filtration. In this regard multiple effect flash evaporation is preferred, as a matter of economy, in that the efficiency of the latter is such as to accomplish reduction in water content of such a slurry to its desired extent at the lowest cost possible.

Another object of the invention is to so process the raw potato that a binder, by way of additive to the finely ground potato slurry, is not necessary in order to obtain the proper plasticity and cohesiveness for the following extrusion or forming step. The elimination of such an additive and/or other process steps to achieve this desired objective, is brought about in my procedure by taking advantage of the gelatinous substances, such as amylose, which is found in the starch itself. These are not gelatinized until the process has reached that stage where the required plasticity for extrusion is necessary.

Another objective of the invention is to provide a method of the described type wherein, in line with the foregoing, the slurry or mass of finely ground potato solids, during the moisture removal step, is maintained at a temperature below the gelatinization point, thus enabling proper handling of the slurry which as a consequence is of such viscosity as to easily flow through a multiple effect evaporation setup. In this regard gelatinization is deemed to occur somewhere between about 150° F. to 170° F. The exact point of gelling cannot be precisely estimated with regard to a given product, for, depending upon the type of potato, there will be some variance. At any rate, maintenance of the slurry at a temperature below about 150° F. during grinding and during multiple effect evaporation, will assure nongelatinization, and hence proper processing.

Finally, a further objective of the invention is to provide a process assuring that during the course thereof the product, and particularly as finely ground potato in an aqueous slurry, will not be subject to undue air contact or other procedures which might interfere with maintaining proper color. As to air contact, the above noted use of vacuum dehydration necessarily eliminates contact with the air, thus to prevent oxidative browning. Further, the elimination of such water removal procedures as centrifuging or filtration, gives assurance that the gels which are in solution, are retained in that solution so that they themselves constitute the "binder" when the point is reached for high temperature gelatinization, i.e., at that point where, after water removal, extrusion into suitable formation for deep-fat frying is necessary as the final step.

As started in the foregoing, my procedure fundamentally differs from the prior art in the use of vacuum dehydration to initially reduce the water content to that amount which imparts to the mass the required cohesiveness and plasticity necessary for extrusion and subsequent handling. If certain alternatives to vacuum dehydration are employed, such as centrifuging or filtration then that cohesiveness is not obtainable. On the other hand, air drying promotes undue browning or discoloration. Also if air drying be employed it is most difficult, it not impossible, to obtain the raw potato mass in this required state of cohesiveness or plasticity which enable proper extrusion of it into a shape suitable for deep-fat frying without color deterioration. The following examples illustrate the accuracy of the foregoing statements. In both cases only air drying was used in contradistinction to the process of my invention, where the all important step of vacuum dehydration is employed.

EXAMPLE 1

Approximately 1 lb. of raw unpeeled potatoes were peeled, washed, and then sliced. This sliced product was then soaked in a soaking solution consisting of about 0.3 percent sodium bisulfite by weight. The potato slices were drained after soaking, and then dried by paper toweling to absorb moisture, and then air dried at 100° F. using a fan to promote air circulation across the potato surfaces.

The raw product was then run through a high speed blender to create a liquid mass or slurry of the raw product.

The latter was then heated to a temperature of about 200° F. for the purpose of gelling the starch in the potato, a suitable heat exchanger being utilized for this purpose. The mass was then cooled by atmospheric cooling bringing the temperature down to about 100° F. The following tabulation was made regarding the above procedure:

| | |
|---|---|
| Wt. of unpeeled potato | 412.4 g. |
| Wt. of peeled potato | 347.6 g. |
| Peeling loss | 64.8 g. |
| | (15.7%) |
| Wt. of slices after soaking | 379.1 g. |
| Wt. of increase from soaking | (9.06%) |
| Wt. after drying 1 hr. at 100° F. | 258.95 g. |
| Drying loss | (31.7%) |
| % solids based on 80% initial | |
| H$_2$O | 57.6% |
| % moisture by difference | 42.4% |

After air cooling, as above, the product was extruded by means of a usual type of extrusion media. The resultant extruded product obtained as set forth in the foregoing was a semisolid, and although of some plasticity, was very dark gray in color, demonstrating that this manner of dehydration (air drying), did, either by oxidation of the mass or enzymic action or both, cause substantial "browning" or undesirable discoloration.

EXAMPLE 2

The same procedure of example 1 was here followed, except that initial toweling of the potato slices to remove surface moisture was omitted, and also, the mass was gradually cooled in still air maintained at a temperature of 100° F. The following data was noted with regard to the procedure of this example:

| | |
|---|---|
| Wt. of unpeeled potato | 670.2 g. |
| Wt. of peeled potato | 583.45 g. |
| Peeling loss | 86.75 g. |
| Wt. of slices after soaking | 616.70 g. |
| Wt. of increase from soaking | 33.25 g. |
| | (5.7%) |
| Wt. after drying 1 hr. at 100° F. | 530.85 g. |
| Drying loss | 85.85 g. |
| | (13.9%) |
| % solids based on 80% initial | |
| H$_2$O | 21.98% |
| % moisture by difference | 78.02% |

The extruded product of this procedure of example 2 was somewhat lighter in color but still remained only a semifluid mass most difficult to handle. It thus was not of the proper cohesiveness or plasticity which would render the product suitable for immediate deep-fat frying.

In neither of the procedures followed in examples 1 and 2 was a product obtained comparable to the product resulting from the practice of my process of dehydration of the potato slurry accomplished by simple vacuum application, or single, or multiple effect evaporation.

Regarding the above, where air drying is the means for reduction of water content of the slurry it is further clear that same, whether accomplished by the belt type or drum type or air dryer, is far less economical in this particular procedure than vacuum evaporation. This can be determined by calculation. For example, at a temperature as low as 100° F., the driving force to remove moisture in an air dryer is very low and the heat transfer coefficient between the air and the solid product is also very low, probably on the order of 10 to 15 B.t.u.'s/(hr.) (ft.$^2$) (° F.). In a vacuum evaporator the driving force is increased by lowering the temperature at which water will boil. Also a heat transfer coefficient can be achieved of at least 100 to 150 B.t.u.'s/(hr.) (ft.$^2$) (° F.) in the heating element of a forced circulation vacuum evaporator. The economic value of multiple effect vacuum evaporation is thus demonstrated.

MORE PARTICULAR DESCRIPTION OF THE INVENTION

The appended FIG. is a flow diagram of the process of this invention, illustrating particularly the use of multiple effect "flash" evaporation as the recommended manner of water removal from the slurry prior to gelatinization and forming of the product by extrusion or equivalent means.

Referring now to the Figure, the process commences by feeding peeled raw potatoes into a rotary cutter or grinder 10. Here the potatoes are ground or macerated at room temperature to form a slurry which can be readily transported as a fluid. The potato slurry flows to a vessel 12 where a few parts per million of sodium bisulfite or equivalent, is added in reducing enzymatic activity. Sodium bisulfite is here added in an amount of about 0.3% by weight of the potato solids.

From vessel 12, the slurry flows to a combination colloid mill-pump or homogenizer-pump 14 driven by motor 16 wherein the particle size of the slurry is reduced further, preferably to an average size of about 80 to 100 microns or smaller. A water-cooled heat exchanger 18 is provided to assure that the slurry exiting the grinder is maintained below gelatinization temperature of about 150° F. Such temperature may be reduced to about 100° F., thus giving complete assurance of nongelatinization. As shown, this heat exchanger is positioned in contact with the grinder in such fashion as to perform this heat-reduction function. As shown, the mill-pump is completely jacketed, with the cooling fluid completely surrounding it. Without cooling, the friction inherent in the grinding operation could or will heat the slurry above the gelatinization temperature of the starch, thereby making further processing in the form of a slurry impossible, and this because of restriction of flow through the vacuum system.

Although any type of vacuum apparatus may be useful, from the colloid mill-pump 14, I prefer to feed the potato slurry into a series of multiple effect flash evaporator stages.

A double effect evaporator is illustrated in the flow diagram; and this by way of example only. Other effects can be added or deleted to increase or decrease the economy (pounds of evaporation per unit of heat added) as economics might dictate. The effect receiving prime steam or heat (right hand in this case) is termed the first effect and the one heated with vapor from the first effect is termed the second effect, etc. In some operations such as saline water conversion plants there may be 12 or more affects tied together so that steam or thermal energy is actually used 12 times before being discarded or returned to the heat source. The application of that same principle may here be desirable.

Each of these effects comprises a pump, a heater, and a flash chamber. Using the left hand (as viewed in the FIG.) unit, the second effect for illustration, the potato slurry flows from pump 20 into heater 22. The latter may simply comprise a heated jacket surrounding a flow-through pipe or plate type heat exchanger which has certain advantages for heating viscous liquids or slurries. The addition of heat in heater 22 raises the temperature of the slurry several degrees. The heat source will be described below. The heated slurry then flows to the chamber 24 which is maintained at a subatmospheric pressure, a preferred pressure being 1.0 to 1.5 inches of mercury absolute, and at a preferred temperature of 70–80° F. Flashing of water vapor occurs in the flash chamber 24 until the temperature of the slurry from the heater has dropped to a point where its vapor pressure is equal to the pressure in the flash chamber, viz, 1.0–1.5 inches of water.

Literature indicates that gelatinization of potato starch may commence in a region between 115 and 122° F. However, it has been found in practice that gelatinization proceeds at a somewhat low rate at temperatures between 150° F. and 160° F. and does not proceed rapidly, or is completed, and depending in large part upon the type of product feed, until a temperature of 180 to 200° F. is reached. By operating the second effect at subatmospheric pressures, the evaporation of water may thus be accomplished at temperatures low enough to avoid any appreciable conversion of the starch to a gelatin form, i.e., temperatures below 100° F. Maintaining the potato starch in a slurry consistency facilitates flow through the entire process, and such consistency cannot be assured if the temperature utilized is so high as to promote gelatinization. This has been pointed out in the foregoing.

The vacuum which is applied to the second effect is created by a vacuum pump or steam jet ejector (not illustrated), the pressure being controlled by a vacuum controller 25 and a controlling valve 26 which allows air to bleed into the system at a controlled rate. Between the second effect and the steam jet ejector is a barometric contact condenser 28 which is supplied with cooling water. The condensate formed in condenser 28 is fed to a hot well through a barometric leg and thence to a sewer or returned to a cooling tower.

The flow of the slurry to this second effect is regulated by valve 30. The latter is governed by a level controller 32 in response to the slurry level in the body 24. Flow through valve 30 is reduced proportionally when the slurry level rises to a predetermined point, and increased as the level falls, thereby maintaining a substantially uniform level in the evaporator.

The first effect evaporator comprises pump 34, heater 36, flash chamber 38, valve 40 and valve controller 42, each of which functions in a manner identical to that described above. Heater 36 is supplied with water or other fluid at a temperature of about 150–170° F. and evaporator 38 is maintained at 3 to 4 inches of mercury absolute pressure and a temperature of about 115–125° F. This temperature is still below that at which little or any significant conversion of the potato starch would occur.

The water vapor liberated in the first effect flash chamber 38 is fed to heater 22 of the second effect, this flow being established by pump 44 or by a barometric leg. By thus utilizing the heat in the vapor from the first effect, the total amount of energy required to dehydrate the slurry, and as above stated, is substantially reduced.

In the second effect evaporator, the moisture content of the slurry is preferably reduced in such amount as to have from 45 to 55% retained moisture in the slurry. The effective viscosity of the slurry will increase but not sufficiently, at this juncture, to create a serious problem as far as pumping and handling are concerned; the slurry will continue to flow as a fluid, or possess that level of viscosity permitting free fluid flow.

The slurry from the double effect evaporator is then fed to a combination cooker and extruder 46. A valve 25 and flow responsive controller 48 provide a constant rate of flow input to the cooker and extruder unit. The cooker is heated by steam or hot water supplied at a temperature between 212 and 250° F., which heats the starch to from about 200 to 225° F.

Such is sufficiently high to assure complete gelatinization of the potato starch.

The extruder 51, driven by motor 52, extrudes the product at a pressure of 10 to 75 p.s.i.g. depending upon the shape of the extrusion die and the rate of flow through the die. From the extruder, the gelatinized product may be fed to a drying belt for further dehydration or to a cutting and forming machine to place the potato product in the form of chips, french fries, or the like and thence to a drying belt. Although preferred, as an alternative to extrusion, the product can be cooked and then rolled or moulded if desired.

It has been found that extruded material produced by the process of this invention is a plastic solid having considerable cohesiveness, or interfacial tenacity. It can be handled quite easily in either a bath or a continuous flow hot air dryer. Alternatively, the cooked-extruded product can be simply air dried.

Upon drying to a moisture content of about 6% to 12%, the partially dehydrated starch product is ready for subsequent frying in oil at a cooking temperature of from about 375° to 400° F. This subsequent frying is greatly facilitated by the prior removal of a substantial portion of the moisture of the potato. In this instance, and as stated, from an initial moisture content in the slurry of about 80% or above, the moisture content thereof is reduced by vacuum evaporation to from about 45% to 55% with a 50% moisture retention being preferred. The following air drying after extrusion removes moisture to the extent above indicated.

Due to a hard, essentially leak proof, hornylike shell on the partially dried product and due to the amount of moisture retained in the product, the heat from the frying causes an internal steam pressure to develop which expands the dehydrated starch into a tasty, crunchy, and appealing good product.

Prior to frying, the dehydrated product can be stored at room temperature in a moisture resistant container for as long as 2 years without any apparent harmful effect. Salt, typically necessary to product satisfactory puffing in prior art processes, can be added in the process of this invention after frying and puffing, thus preventing salt contamination in the main body of cooking oil.

The aspect of vacuum evaporation of this invention, and particularly the more economic procedure of multiple effect evaporation, affords a means for efficiently dehydrating raw potato prior to conversion of the potato starch to gelatin form. Naturally, simple or single effect vacuum evaporation is also useful. In any event vacuum of the order of one to four inches of mercury is sufficient to attain the objectives of the invention.

Such evaporation is accomplished while the starch is still in a pumpable, slurry form, and results in a substantially reduced evaporative load on the drier.

The use of vacuum in the evaporation step is also deemed to significantly reduce the tendency of water to migrate into the individual starch granules and thereby decrease the rate at which starch cells swell and burst, thus to release amylose, the latter constituting the primary component causing gelatinization.

The only additional ingredient which may be desirable as an additive is a discoloration inhibiting agent, to further assure nonbrowning. However, if such as sodium bisulfite is used, much if not all of it is released and escapes during the evaporation and drying steps. The process herein disclosed makes use of the entire peeled raw potato, and produces essentially pure dehydrated potato in a form suitable for subsequent forming and cooking. This invention may be further developed within the scope of the following claims. Accordingly, the above description is to be interpreted as illustrative only, and not in a strictly limited sense. In this regard, the scope of the invention is not to be limited except as by the limitations found in the claims to the invention appended hereto.

I claim:

1. A process for producing a dehydrated potato product directly from raw potato wherein only the gelatinization promoting substances in the potato itself are utilized as binder which comprises grinding raw potato into a water slurry consistency having a moisture content of about 80%, and maintained below gelatinization temperature of about 1500° F., reducing said moisture content of said slurry without air contact by at least a first and second state of multiple effect vacuum dehydration to from 45% to 55% retained moisture content, each of said stages being operated at a pressure of between 1 to 4 inches mercury absolute pressure, the first stage of said vacuum dehydration being at a higher pressure than the second stage, thereby to maintain said potato slurry at a temperature substantially below the gelatinization temperature thereof of from about 150° to 170° F. and in the absence of outside air to avoid browning of the potato, forming and cooking said dehydrated potato slurry in a combination cooker and extruder at a temperature of from about 200° F. to about 225° F. to completely gelatinize the starch in the potato, and further drying said product prior to frying in oil to from about 6% 12% to retained moisture content.

2. The process of claim 1 wherein said moisture content is reduced to about 50% and said potato slurry during said vacuum dehydration is maintained at a temperature below about 120° F.

3. The process of claim 1 wherein each of said stages are controlled to maintain the below gelatinization temperature of said slurry to between 70° F. and 100° F.

4. The process of claim 1 wherein said first stage is operated at a pressure of 1.0 to 1.5 inches of mercury absolute.

* * * * *